United States Patent
De Craemer

(10) Patent No.: US 10,710,421 B2
(45) Date of Patent: Jul. 14, 2020

(54) TOWED IMPLEMENT WITH HEIGHT ADJUSTABLE HITCH

(71) Applicant: CNH Industrial America LLC, New Holland, PA (US)

(72) Inventor: Barbara De Craemer, Sint-Andries (BE)

(73) Assignee: CNH Industrial America LLC, New Holland, PA (US)

( * ) Notice: Subject to any disclaimer, the term of this patent is extended or adjusted under 35 U.S.C. 154(b) by 175 days.

(21) Appl. No.: 15/965,148

(22) Filed: Apr. 27, 2018

(65) Prior Publication Data
US 2019/0329613 A1    Oct. 31, 2019

(51) Int. Cl.
*B60D 1/46*    (2006.01)
*A01B 59/042*    (2006.01)
*A01D 90/08*    (2006.01)

(52) U.S. Cl.
CPC .............. *B60D 1/46* (2013.01); *A01B 59/042* (2013.01); *A01D 90/083* (2013.01)

(58) Field of Classification Search
CPC ................................ B06D 1/46; A01D 90/083
USPC ......................................................... 172/605
See application file for complete search history.

(56) References Cited

U.S. PATENT DOCUMENTS

| 3,912,018 A | 10/1975 | Brundage et al. |
| 5,465,991 A * | 11/1995 | Kass et al. ............... B60D 1/06 280/406.2 |
| 7,530,779 B2 * | 5/2009 | Holloway et al. ... A01B 59/002 172/273 |
| 8,601,779 B1 * | 12/2013 | Figgins et al. ....... A01D 34/283 56/181 |

FOREIGN PATENT DOCUMENTS

| CN | 204161013 U | 2/2015 |
| EP | 3008985 A1 | 4/2016 |
| WO | 2013090826 A1 | 6/2013 |

* cited by examiner

*Primary Examiner* — Tara Mayo-Pinnock
(74) *Attorney, Agent, or Firm* — Peter Zacharias; Patrick Sheldrake

(57) ABSTRACT

A towed implement for use with a work machine includes a main frame having a pivot hole and at least one hitch mounting hole. A hitch frame is coupled with the main frame and includes a towed end. The hitch frame is pivotable relative to the main frame about a pivot axis at the pivot hole. The hitch frame includes a chamber having an interior periphery with a plurality of notches. A height adjustment arrangement is associated with the main frame and the hitch frame for adjusting a height of the hitch frame. The height adjustment arrangement includes a stop key positioned within the chamber of the hitch frame. The stop key has a hole arranged for receiving a fastener associated with the at least one hitch mounting hole, a cam surface, and at least one tooth extending from the cam surface. Each tooth is received in a corresponding notch.

13 Claims, 10 Drawing Sheets

TOWED IMPLEMENT WITH HEIGHT ADJUSTABLE HITCH

FIELD OF THE INVENTION

The present invention relates to implements towed by work machines, and, more specifically to hitches used on such implements.

BACKGROUND OF THE INVENTION

Work vehicles can be used in the agricultural, construction, industrial and forestry technology sectors. A work vehicle typically is used to perform some type of work, such as baling, excavating, dozing, plowing, harvesting, etc. An agricultural baler can be variously configured, such as a round baler, large square baler or small square baler. In the case of a round baler, hay is fed into the bale chamber from a pickup unit at the front of the baler and rolled into a bale within the bale chamber. When the bale reaches a predetermined or desired diameter, the forward movement of the baler is stopped and the bale is wrapped and ejected from the back of the baler.

It may be desirable for certain applications to have an adjustable height of the hitch at the front of the baler. This allows the horizontal orientation of the baler (i.e., pitch) to be adjusted, which in turn provides for better pickup of crop material by the pickup unit. Known designs for adjusting the hitch height may include an index ring having a plurality of axial teeth on the hitch which engage with axial teeth on the main frame. While such index rings are effective to adjust the hitch height relative to the main frame of the implement, they may not provide height adjustment in incrementally small steps, which can be desirable for some applications. For example, most known index rings used with round balers only provide height adjustment in increments of about 7 to 10° stepwise rotations of the index ring.

SUMMARY OF THE INVENTION

The present invention provides a towed implement with a hitch including a height adjustment arrangement with a stop key which has a cam shaped profile and a tooth which locks into a selected notch to thereby adjust the hitch height of the implement.

The invention in one form is directed to a towed implement for use with a work machine. The implement includes a main frame having a pivot hole and at least one hitch mounting hole. A hitch frame is coupled with the main frame and includes a towed end. A height adjustment arrangement is associated with the main frame and the hitch frame for adjusting a height of the hitch frame. The implement is characterized in that the hitch frame is pivotable relative to the main frame about a pivot axis at the pivot hole. The hitch frame includes a chamber having an interior periphery with a plurality of notches spaced about the interior periphery. The height adjustment arrangement includes a stop key positioned within the chamber of the hitch frame. The stop key has a hole arranged for receiving a fastener associated with the at least one hitch mounting hole, a cam surface, and at least one tooth extending from the cam surface. Each tooth is received in a corresponding notch of the interior periphery.

In one embodiment, the hitch frame includes a slot spaced apart from the pivot axis, with the slot being positioned between the main frame and the chamber and having a curvature which is at a common radius relative to the pivot axis.

In another embodiment, the plurality of notches are spaced apart about the interior periphery at a distance therebetween corresponding to a predetermined height adjustment of the hitch frame.

In another embodiment, the implement is an agricultural baler, the interior periphery has 9 notches, and each notch corresponds to a height adjustment of the implement at the towed end of about 30-35 mm relative to an adjacent notch.

In a further embodiment, the plurality of notches are spaced apart about the interior periphery at a distance (D) therebetween, wherein the spacing D between each pair of adjacent notches can be the same or can vary.

In another embodiment, the cam surface includes a plurality of generally planar reference surfaces positioned in end-to-end relationship to each other about at least a portion of the cam surface. The chamber includes at least one generally planar abutment surface. The fastener passes through the hole of the stop key and has a longitudinal axis. An angular position of the stop key about the longitudinal axis determines which reference surface abuts a corresponding abutment surface.

In yet another embodiment, the stop key has a single tooth positioned at an apex of the cam surface, and the plurality of reference surfaces are located on opposite sides of the single tooth.

In yet another embodiment, the at least one hitch mounting hole of the main frame includes a high hitch mounting hole and/or a low hitch mounting hole.

In a further embodiment, the main frame includes at least one pair of clamping holes spaced apart at a rotational distance that is approximately the same as a rotational distance, relative to the pivot axis, between the high hitch mounting hole and the low hitch mounting hole. The hitch frame includes at least one pair of clamping slots, with each clamping slot being aligned with a respective clamping hole. Each pair of clamping slots has a curvature which is at a common radius relative to the pivot axis.

In a still further embodiment, the chamber extends partially through the hitch frame to the main frame.

In yet another embodiment, the hitch frame includes a first plate lying adjacent to the main frame and extending to the towed end, and a second plate attached to the first plate. The second plate includes the chamber in which the stop key is positioned.

In still another embodiment, the chamber extends completely through the hitch frame to the main frame.

In yet another embodiment, the towed implement is an agricultural round baler.

An advantage of the present invention is that the hitch height can be adjusted in small incremental steps.

Another advantage is that the hitch can be positioned at multiple hitch positions effecting large incremental adjustments of the hitch (e.g., a high hitch position and a low hitch position), and also adjusted in small incremental adjustments of the hitch (using the stop key).

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
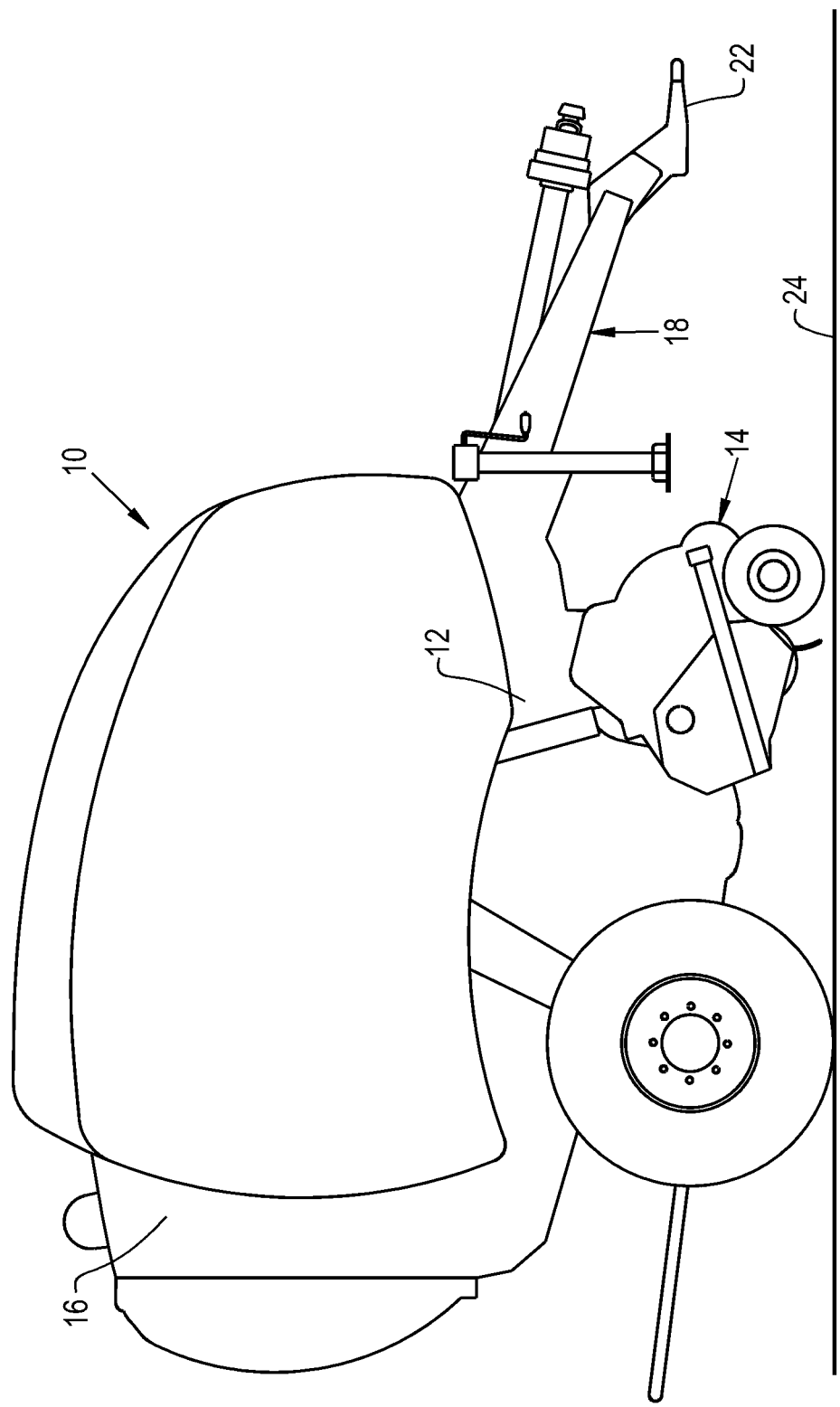
FIG. 1 is a side view of an embodiment of a towed implement in the form of an agricultural round baler.

Referring now to the drawings, and more particularly to FIG. 1, there is shown an embodiment of an implement 10 which can be towed with a work vehicle (not shown). In the illustrated embodiment, the implement 10 is in the form of an agricultural round baler. However, it is to be understood that the present invention is also applicable to other types of towed implements which can be used in the agricultural, industrial, construction and forestry industries. For example, the implement 10 could be in the form of a planter, sprayer, mower/conditioner, scraping pan, etc.

Baler 10 generally includes a main frame 12 which carries a pickup unit 14. The pickup unit 14 picks up windrowed crop from a field, and the crop is conveyed to an interior bale chamber (not shown) within walls 16. A hitch frame 18 is mounted to the front of the main frame 12, as will be described in more detail hereinafter.

Referring now to FIGS. 2-7, the baler 10 includes a height adjustment arrangement 20 associated with the main frame 12 and the hitch frame 18 for adjusting a height of the hitch frame 18 at a towed end 22. Since the draw bar on the work machine (to which the towed end 22 of the baler 10 is coupled) does not change in height, this height adjustment of the towed end 22 in turn adjusts the pitch of the main frame 12 relative to the ground 24 (shown in FIG. 1). With the baler 10 hitched to the traction unit, altering the pitch of the main frame 12 changes the height at the rear end of the hitch frame 18 and the pickup unit 14, which can allow the pickup unit 14 to do a better job of picking up crop under different operating conditions.

The height adjustment arrangement 20 is at a rear end 26 of the hitch frame 18, opposite from a towed end 22. The main frame 12 includes two pairs of plates 72 and 74, each having a pivot hole 32, and at least one hitch mounting hole 34. The placement locations of the holes 32 and 34 on the plates 72 and 74 are the same so that the holes align with each other. The hitch frame 18 is pivotable relative to the main frame 12 about a pivot axis A at the pivot hole 32 which allows a pivoting movement between the hitch frame 18 and main frame 12. The use of multiple hitch mounting holes 34 allows a coarse selection of a hitch height at towed end 22. In the embodiment shown, the main frame 12 includes two hitch mounting holes 34, corresponding to a high hitch mounting hole 34H and a low hitch mounting hole 34L. However, it may be possible to provide a different number of hitch mounting holes. Moreover, in the embodiment shown, the main frame pivot hole 32 is positioned forward of the hitch mounting hole(s) 34 (relative to a direction of travel of the baler 10). However, it may be possible to position the pivot hole 32 at another desired location, such as rearward of or above the hitch mounting hole(s) 34.

The hitch frame 18 includes a first plate 36 lying adjacent to the main frame 12 and extending to the towed end 22, and a second plate 38 attached to the first plate 36. The second plate 38 includes a chamber 40 which extends partially through the hitch frame 18. The chamber 40 has an interior periphery 42 with a plurality of notches 44 spaced about the interior periphery 42. The plurality of notches 44 are spaced apart about the interior periphery 42 at a distance D therebetween corresponding to a predetermined height adjustment of the implement. In the illustrated embodiment, the distance D is the same between each pair of adjacent notches 44. However, the distance D can also vary. Moreover, in the illustrated embodiment, the interior periphery 42 has 9 notches 44, and each notch 44 corresponds to a height adjustment at the towed end 22 of the implement 10 of about 30-35 mm relative to an adjacent notch 44. It is to be understood, however, that the number of notches 44 formed in the interior periphery 42 can be less or more, depending on the specific application.

The height adjustment arrangement 20 also includes a stop key 46 positioned within the chamber 40 of the hitch frame 18. The stop key 46 has a hole 48 arranged for receiving a fastener 50 associated with the at least one hitch mounting hole 34, a cam surface 52, and at least one tooth 54 extending from the cam surface 52. The fastener 50 passing through the hole 48 has a longitudinal axis L. Each tooth 54 is received in a corresponding notch 44 of the interior periphery 42. Thus, if one tooth 54 is provided, then it resides in a corresponding selected notch 44. If two teeth 54 are provided, then each tooth 54 resides in a respective notch 44.

The first plate 36 of the hitch frame 18 includes a curved slot 56 (see FIG. 3) spaced apart from the pivot axis A. The slot 56 is positioned between the main frame 12 and the chamber 40 and has a curvature which is at a common radius relative to the pivot axis A. Thus, as the hitch frame 18 pivots about the pivot axis A, the fastener 50 can move within the slot 56.

The cam surface 52 includes a plurality of generally planar reference surfaces 58 positioned in end-to-end relationship to each other about at least a portion of the cam surface 52. The reference surfaces 58 are configured to abut with a generally planar abutment surface 60 which is formed in the interior periphery 42. The interior periphery 42 can be configured with a single abutment surface 60, or a number of abutment surfaces 60, depending on the application. A selected angular position of the stop key 46 about the longitudinal axis L determines which reference surface 58 abuts with a corresponding abutment surface 60. In the illustrated embodiment, the stop key 46 has a single tooth 54 positioned at an apex of the cam surface 52, and the plurality of reference surfaces 58 are located on opposite sides of the single tooth 54.

The height adjustment arrangement 20 can also include a clamping arrangement 62 for clamping the hitch frame 18 in place relative to the main frame 12. To that end, the main frame 12 includes at least one pair of clamping holes 64 spaced apart at a rotational distance R that is approximately the same as a rotational distance R2, relative to the pivot axis A, between the high hitch mounting hole 34H and the low hitch mounting hole 34L. The relationship between R1 and R2 is dependent on the distance (radius) to the pivot axis A (see FIG. 4). The hitch frame 18 likewise includes at least one pair of clamping slots 66. Each clamping slot 66 is aligned with a respective clamping hole 64, and each pair of clamping slots 66 have a curvature which is at a common radius relative to the pivot axis A.

With the hitch frame 18 having a forked configuration, the two rearward ends of the hitch frame 18 are received between the pair of plates 72 and 74 which are coupled to or integral with the main frame 12. The hitch frame can be detached from the two plates 72 and 74, adjusted in height using the height adjustment arrangement 20, then reinserted between the two plates 72 and 74 and fastened in place.

Figure 8:
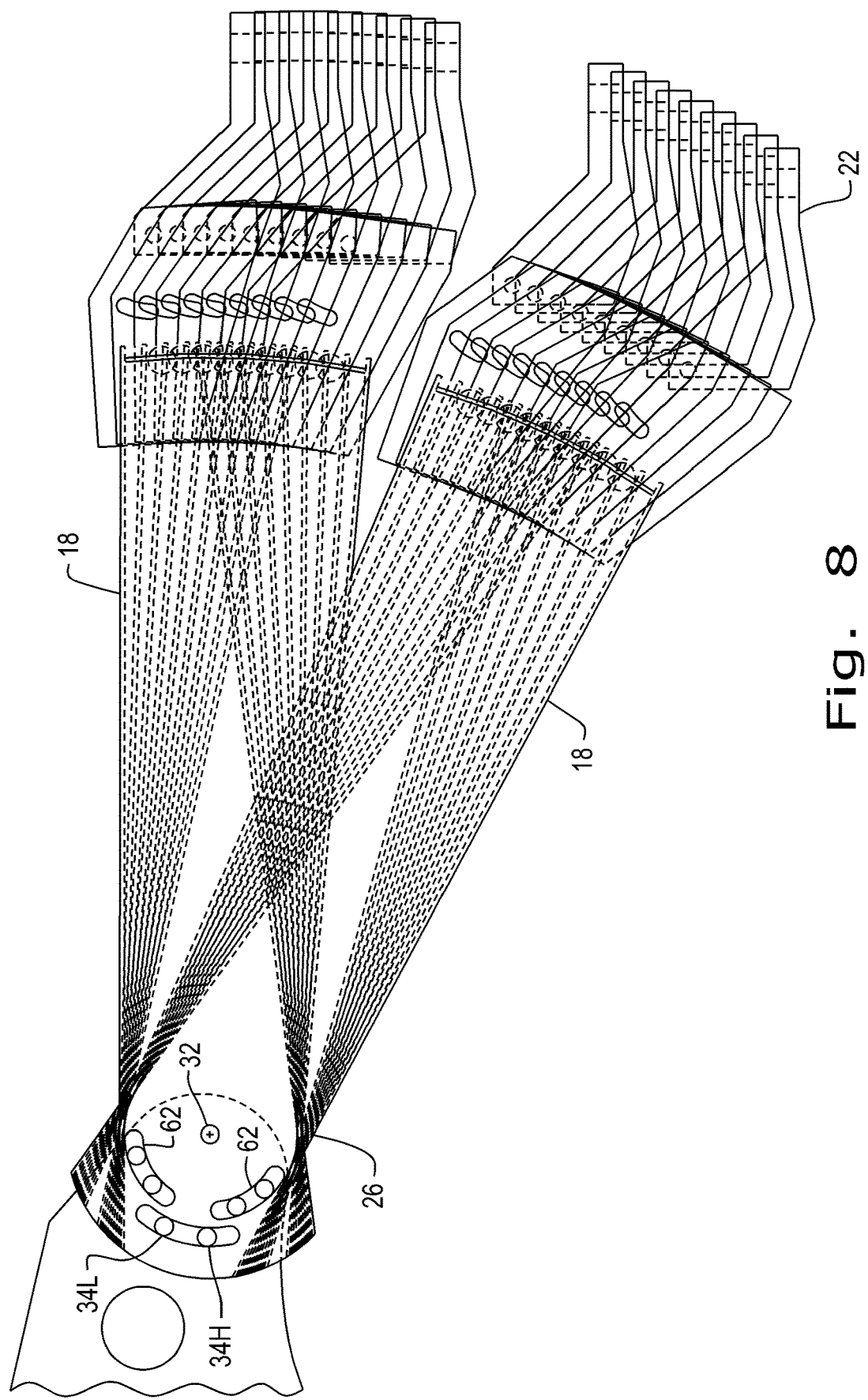
FIG. 8 illustrates hitch height adjustments with the hitch at the high hitch mounting hole and the low hitch mounting hole.

Referring now to FIG. 8, there is shown a graphical illustration of the hitch height adjustments with the hitch at the high hitch mounting hole 34H and the low hitch mounting hole 34L. When the hitch frame 18 is in the high hitch mounting position, there are nine different selectable hitch height locations, dependent on which notch 44 the tooth 54 is positioned. Based on the spacing between the notches 44, there is approximately a 30-35 mm difference in height at the towed end 22 between adjacent notches 44 within the chamber 40. Similarly, when the hitch frame 18 is in the low hitch mounting position, there are nine different selectable hitch height locations, dependent on which notch 44 the tooth 54 is positioned. Based on the spacing between the notches 44, there is approximately a 30-35 mm difference in height at the towed end 22 between adjacent notches 44 within the chamber 40.

Figure 2:
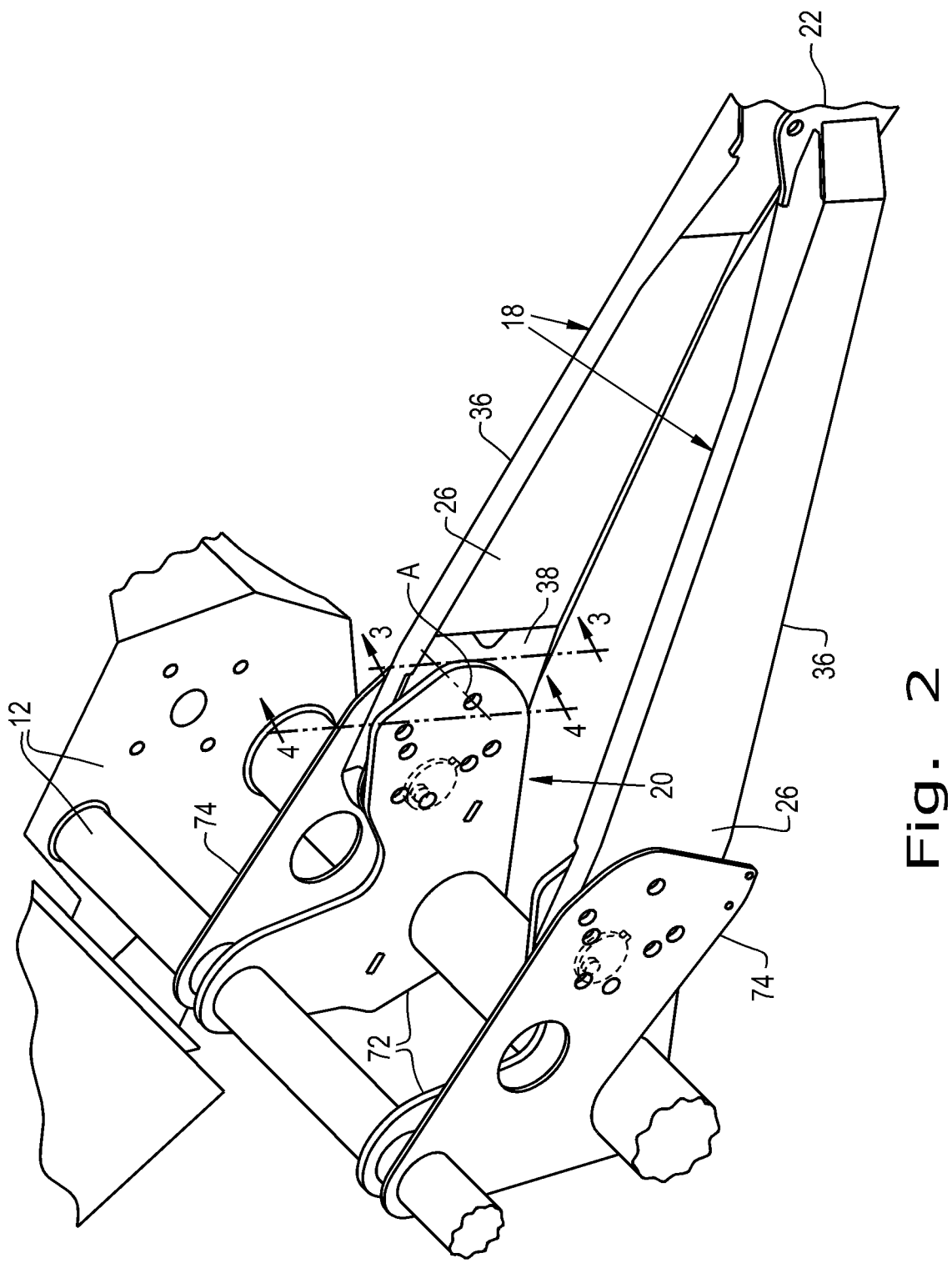
FIG. 2 is a perspective view of a portion of the main frame and hitch frame on the round baler shown in FIG. 1.
Figure 3:
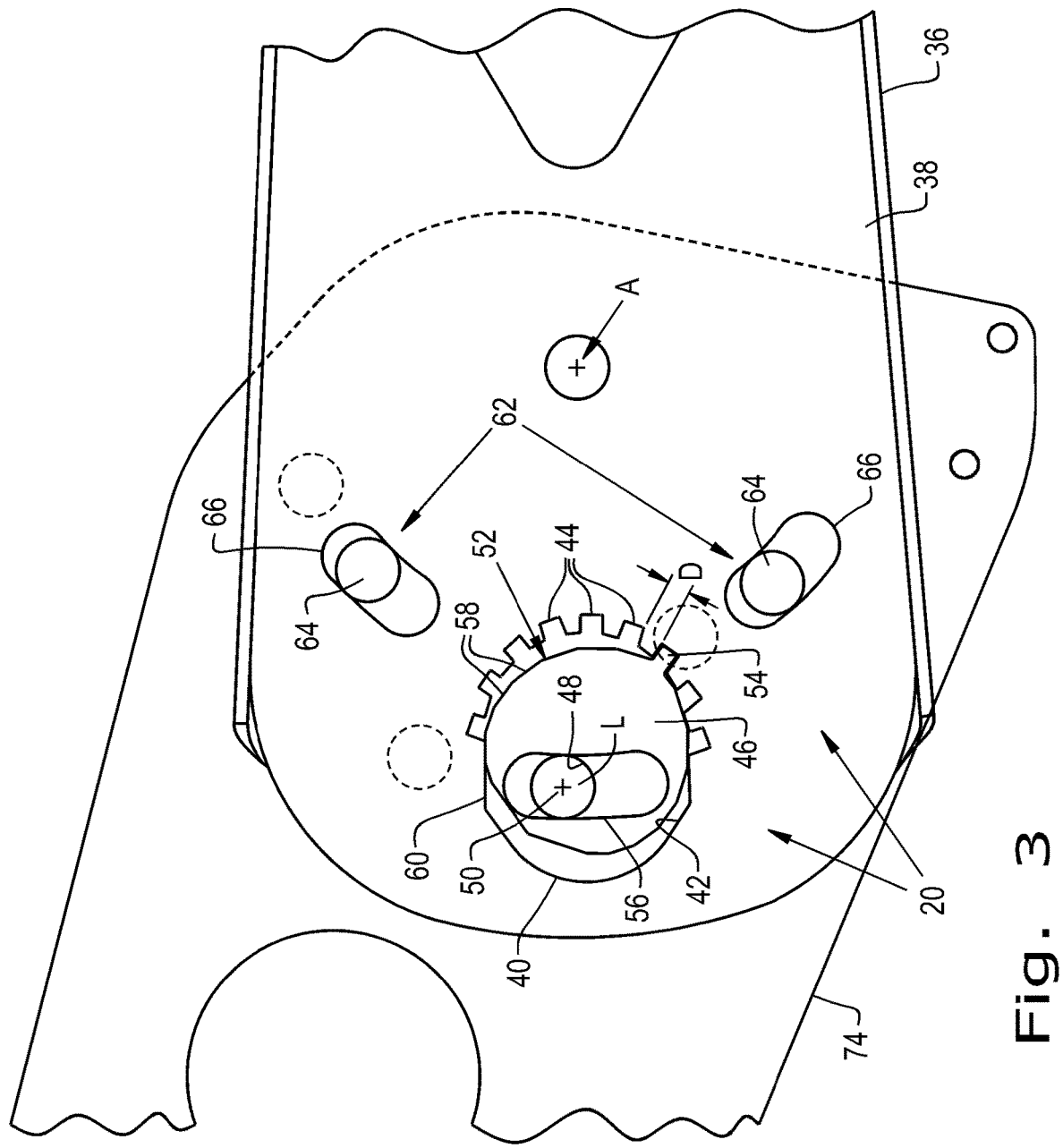
FIG. 3 is a partial sectional view taken along line 3-3 shown in FIG. 2.
Figure 4:
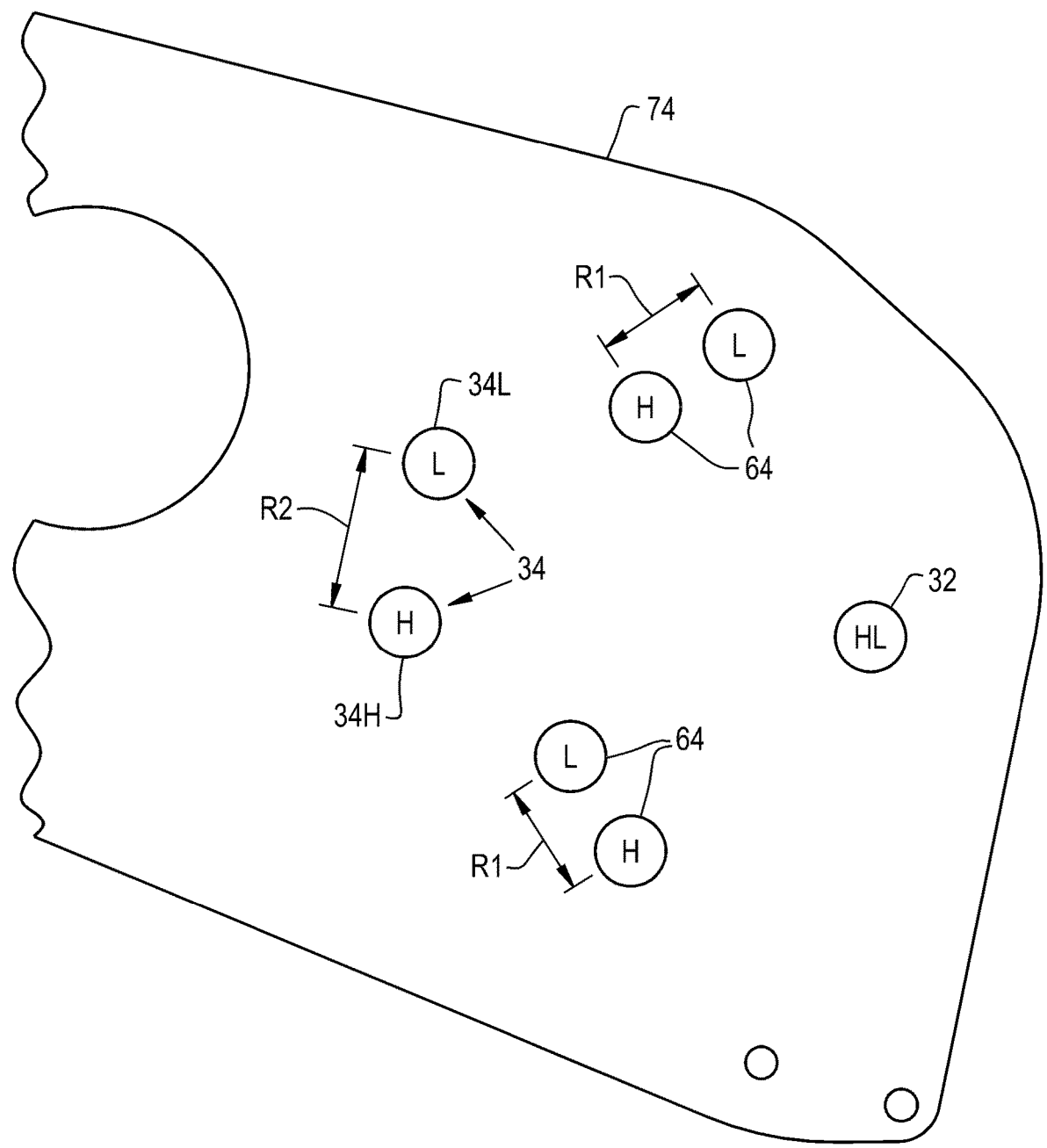
FIG. 4 is a partial sectional view taken along line 4-4 shown in FIG. 2.
Figure 5:
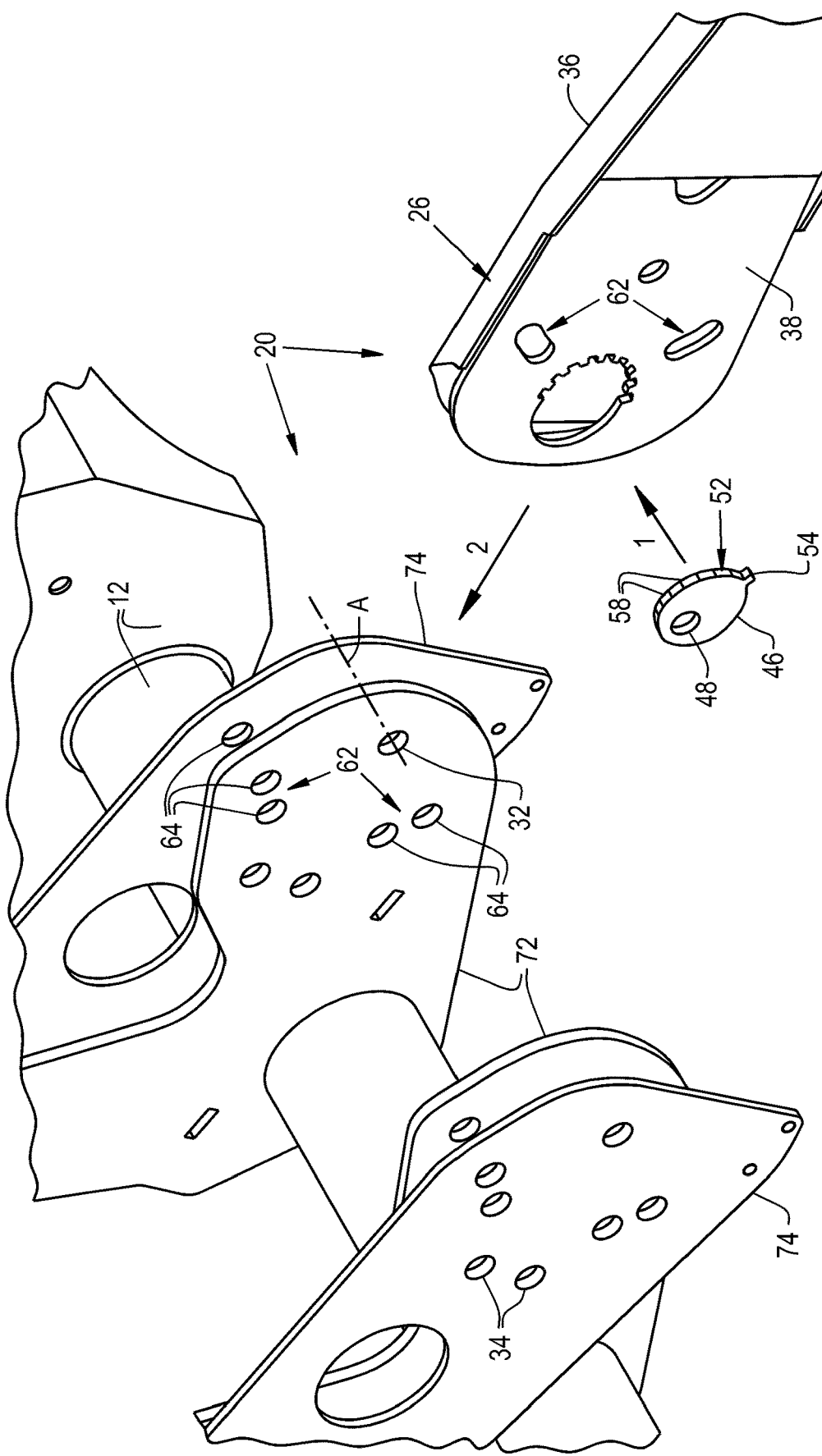
FIG. 5 is a partial perspective view of the hitch frame disassembled from the main frame.
Figure 6:
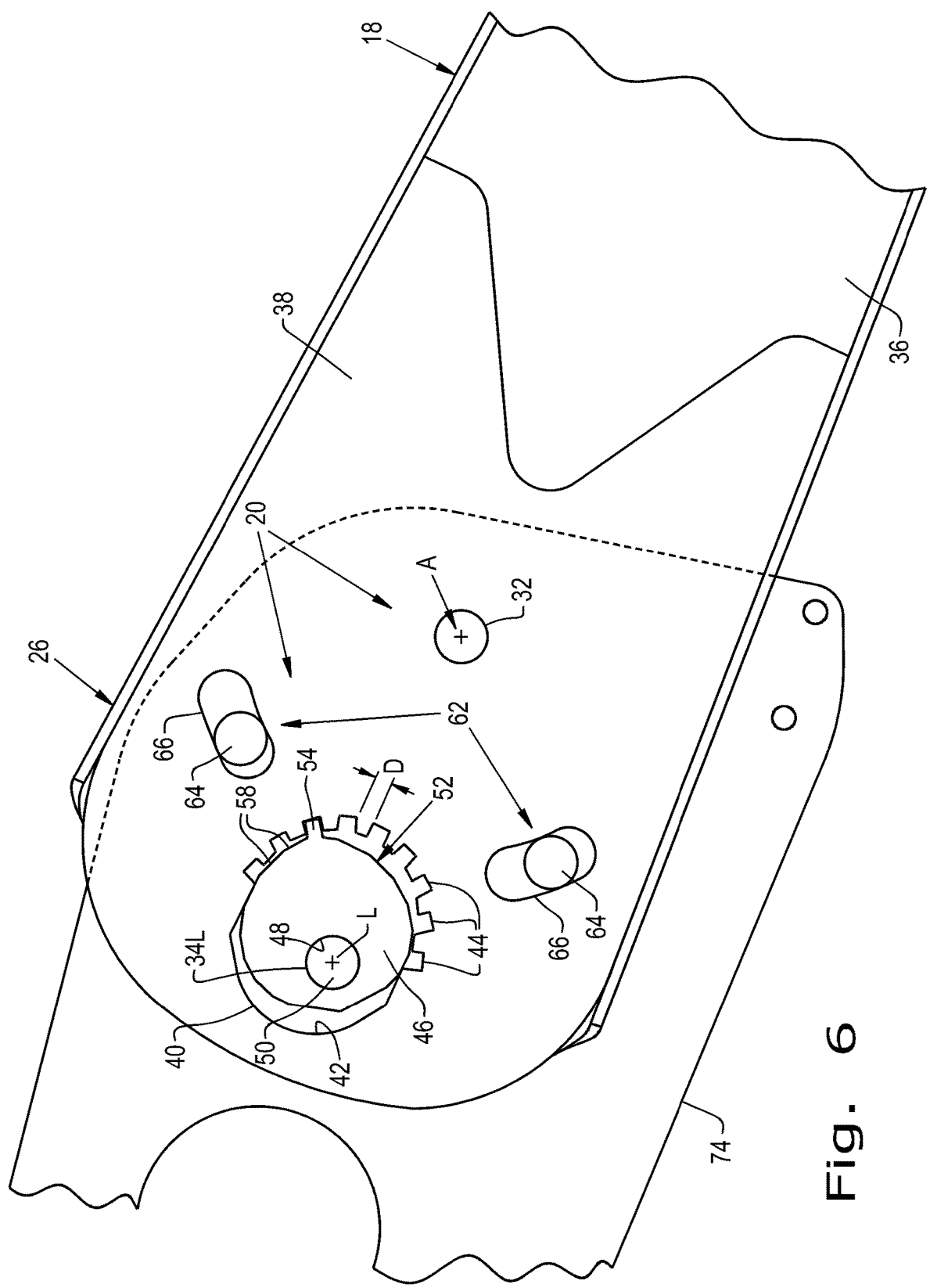
FIG. 6 is a partial side view with the stop key at the low hitch mounting hole, and the tooth in a selected notch within the chamber.
Figure 7:
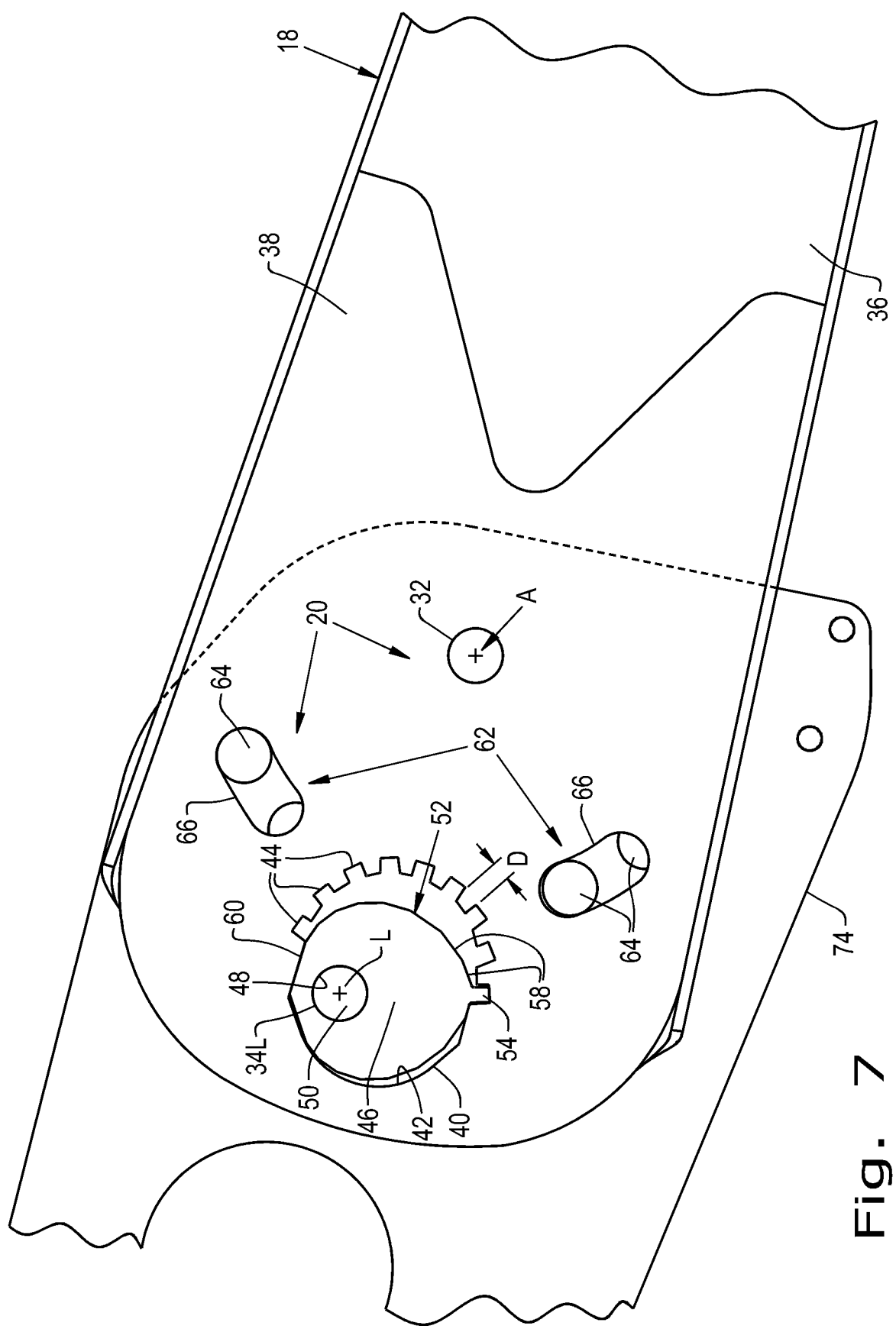
FIG. 7 is a partial side view with the stop key at the low hitch mounting hole, and the tooth in another selected notch within the chamber.
Figure 9:
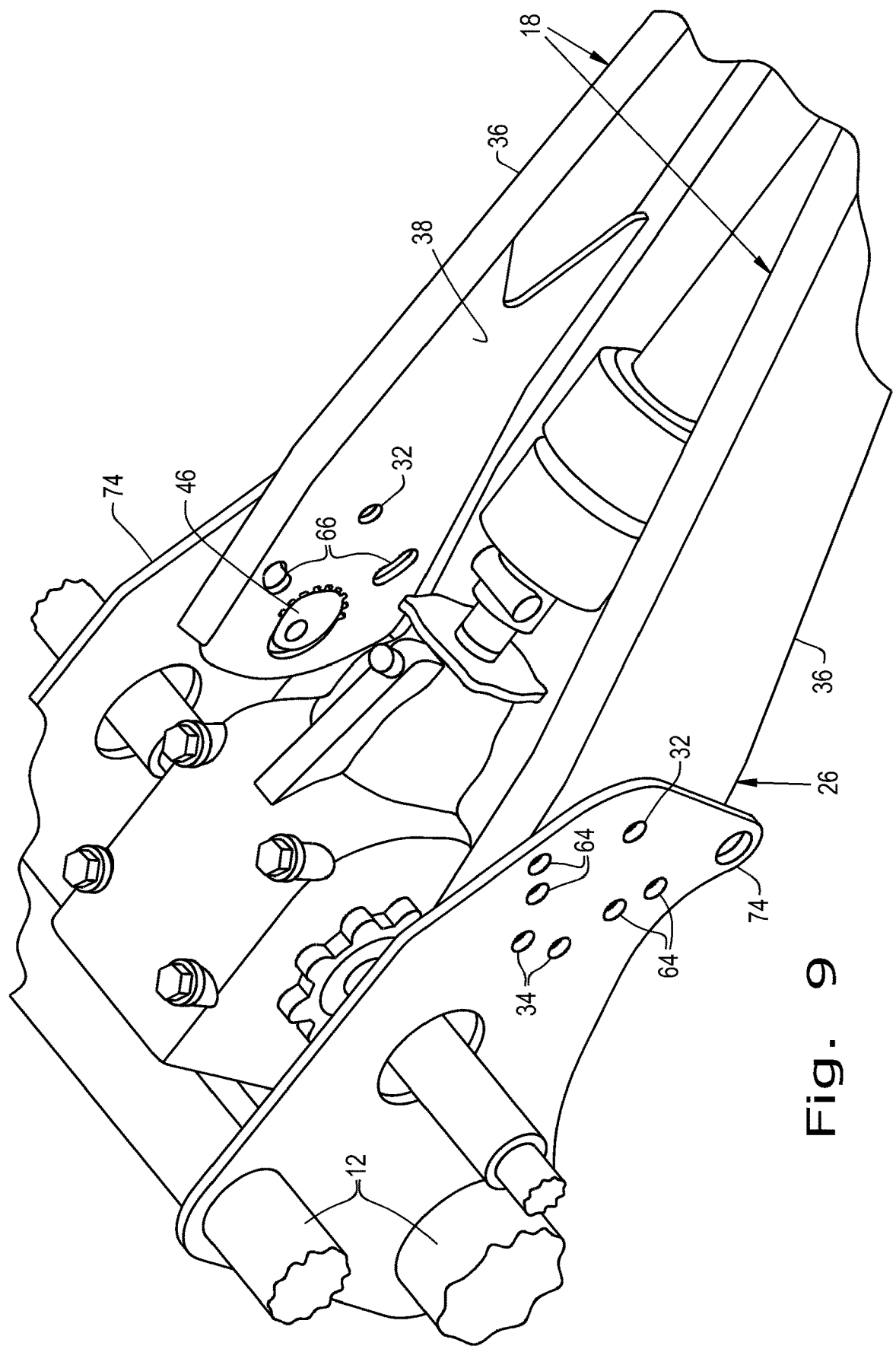
FIG. 9 is a perspective view of another embodiment showing a portion of the main frame and hitch frame.

Referring now to FIG. 9, there is illustrated a perspective view of another embodiment of a height adjustment arrangement 70 showing a portion of the main frame 12 and hitch frame 18. Referring back to FIG. 2, it can be seen that two separate plates 72 and 74 which are coupled with the main frame 12 sandwich the pair of rearward ends of the hitch frame 18 therebetween. Now again referring back to FIG. 9, this embodiment of the height adjustment arrangement 70 differs in one aspect in that only a single plate 74 is positioned on one side of each rearward end of hitch frame 18. In FIG. 2, the thicker of the two plates 72 is positioned on the lateral inside of a respective rearward end of the hitch frame 18. Conversely, in the embodiment shown in FIG. 9, the thicker plate 74 is positioned on the lateral outside of a respective rearward end of the hitch frame 18.

Figure 10:
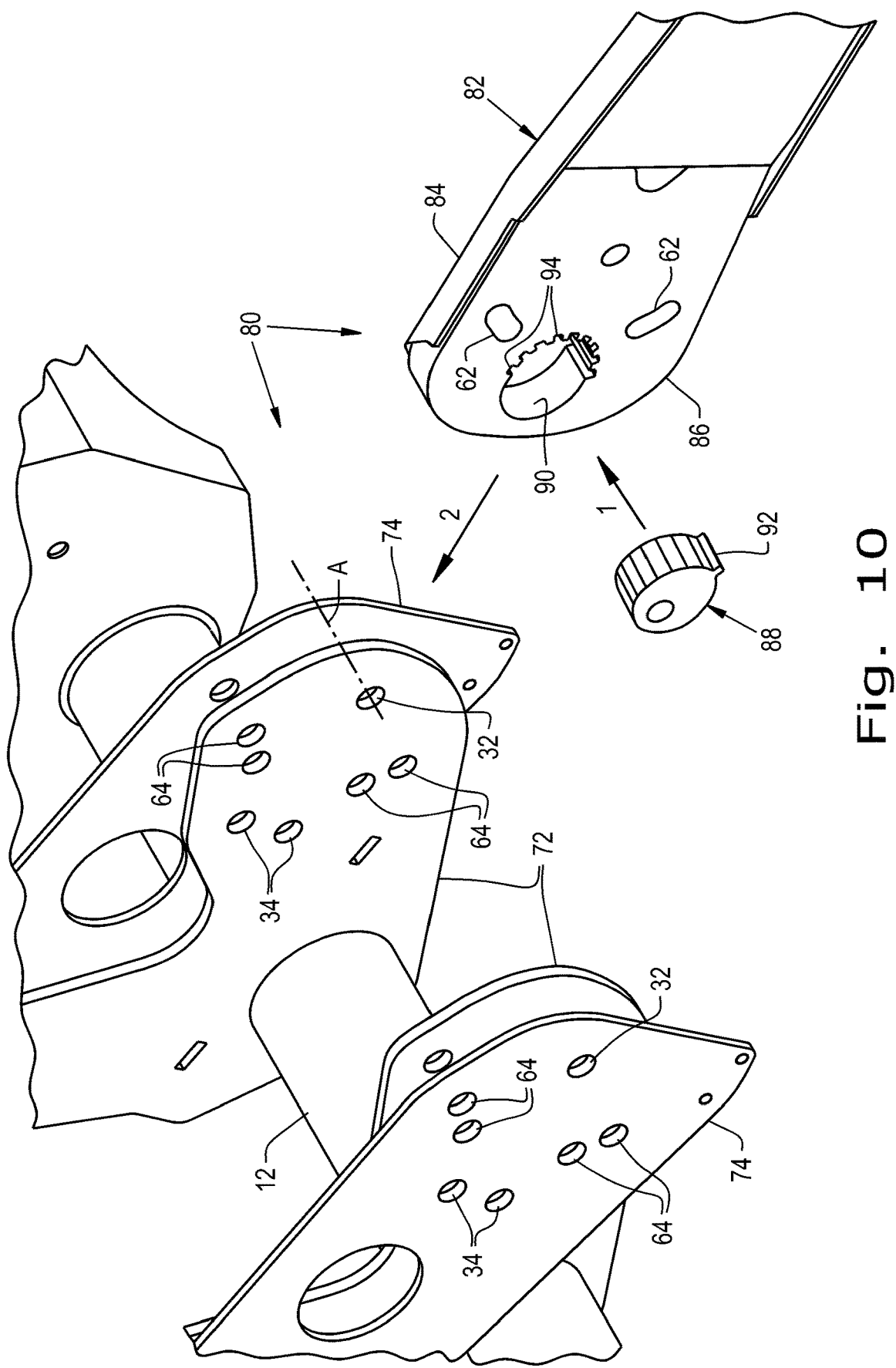
FIG. 10 is a perspective view of yet another embodiment showing a portion of the main frame and hitch frame, with the hitch frame disassembled from the main frame.

Referring now to FIG. 10, there is illustrated a perspective view of yet another embodiment of a height adjustment arrangement 80 showing a portion of the main frame 12 and hitch frame 82, with the hitch frame 82 disassembled from the main frame 12. In this embodiment, the hitch frame 82 includes a first plate 84 that extends from near the rearward end to the opposite towed end. However, a second plate 86 extends a full width of the hitch frame 82. The stop key 88 likewise extends the full width of the hitch frame 82, and is placed within a chamber 90 within the second plate 86. The stop key 88 is oriented within the chamber 90 such that the tooth 92 is within a selected notch 94. Then the rearward end of the hitch frame 82 is slid between the two plates 72 and 74.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A towed implement for use with a work machine, comprising:
   a main frame including a pivot hole and at least one hitch mounting hole;
   a hitch frame coupled with the main frame, the hitch frame including a towed end and being pivotable relative to the main frame about a pivot axis at the pivot hole, the hitch frame further including a chamber having an interior periphery with a plurality of notches spaced about the interior periphery; and
   a height adjustment arrangement associated with each of the main frame and the hitch frame for adjusting a height of the hitch frame, the height adjustment arrangement including a stop key positioned within the chamber of the hitch frame, the stop key having a hole arranged for receiving a fastener associated with the at least one hitch mounting hole, a cam surface, and at least one tooth extending from the cam surface, each the tooth being received in a corresponding one of the plurality of notches of the interior periphery.

2. The towed implement of claim 1, wherein the hitch frame further includes a slot spaced apart from the pivot axis, the slot being positioned between the main frame and the chamber and having a curvature which is at a common radius relative to the pivot axis.

3. The towed implement of claim 1, wherein the plurality of notches are spaced apart about the interior periphery at a distance therebetween corresponding to a predetermined incremental height adjustment of the implement.

4. The towed implement of claim 3, wherein the implement is an agricultural baler, the interior periphery has 9 notches, and each notch corresponds to an incremental height adjustment of the implement of at the towed end of about 30-35 mm relative to an adjacent the notch.

5. The towed implement of claim 1, wherein the plurality of notches are spaced apart about the interior periphery at a distance therebetween, wherein the distance between each pair of adjacent notches can be the same.

6. The towed implement of claim 1, wherein:
   the cam surface includes a plurality of generally planar reference surfaces positioned in end-to-end relationship to each other about at least a portion of the cam surface;
   the chamber includes at least one generally planar abutment surface;
   the fastener passing through the hole of the stop key has a longitudinal axis; and
   an angular position of the stop key about the longitudinal axis determines which the reference surface abuts a corresponding the abutment surface.

7. The towed implement of claim 6, wherein the stop key has a single tooth positioned at an apex of the cam surface, and the plurality of reference surfaces are located on opposite sides of the single tooth.

8. The towed implement of claim 1, wherein the at least one hitch mounting hole of the main frame includes at least one of a high hitch mounting hole and a low hitch mounting hole.

9. The towed implement of claim 8, wherein:
the main frame includes at least one pair of clamping holes spaced apart at a rotational distance that is approximately the same as a rotational distance, relative to the pivot axis, between the high hitch mounting hole and the low hitch mounting hole; and
the hitch frame includes at least one pair of clamping slots, each the clamping slot being aligned with a respective the clamping hole, and each the pair of clamping slots having a curvature which is at a common radius relative to the pivot axis.

10. The towed implement of claim 1, wherein the chamber extends partially through the hitch frame.

11. The towed implement of claim 1, wherein the hitch frame includes a first plate lying adjacent to the main frame and extending to the towed end, and a second plate attached to the first plate, the second plate including the chamber in which the stop key is positioned.

12. The towed implement of claim 1, wherein the chamber extends completely through the hitch frame to the main frame.

13. The towed implement of claim 1, wherein the towed implement comprises an agricultural round baler.

\* \* \* \* \*